United States Patent [19]

Wulff

[11] 3,923,843

[45] Dec. 2, 1975

[54] EPOXIDATION PROCESS WITH IMPROVED HETEROGENEOUS CATALYST

[75] Inventor: Harald P. Wulff, Alameda, Calif.

[73] Assignee: Shell Oil Company, Houston, Tex.

[22] Filed: Dec. 7, 1973

[21] Appl. No.: 422,950

Related U.S. Application Data

[60] Division of Ser. No. 234,301, March 13, 1972, Pat. No. 3,829,392, which is a continuation-in-part of Ser. No. 77,385, Oct. 1, 1970, abandoned.

[52] U.S. Cl. .......................................... 260/348.5 L
[51] Int. Cl.² ...................................... C07D 301/20
[58] Field of Search ............................. 260/348.5 L

[56] References Cited
UNITED STATES PATENTS 3,332,965  7/1967  Fukui et al. ................... 260/348.5 R Primary Examiner—Norma S. Milestone

[57] ABSTRACT

Solid chemical combinations of certain metal oxides or hydroxides with oxygen compounds of silicon give improved performance as catalysts for the epoxidation of olefinically unsaturated compounds with organic hydroperoxides when the catalysts are first treated with an organic silylating agent at an elevated temperature.

18 Claims, No Drawings

EPOXIDATION PROCESS WITH IMPROVED HETEROGENEOUS CATALYST

CROSS REFERENCES TO RELATED APPLICATIONS

This is a division of application Ser. No. 234,301 filed Mar. 13, 1972 now U.S. Pat. No. 3,829,392 which is a continuation-in-part of application Ser. No. 77,385 filed Oct. 1, 1970 now abandoned.

The subject matter of this application is related to the following U.S. patent applications: Ser. Nos. 812,920, 812,923 and 812,924, all filed Apr. 2, 1969, by H. P. Wulff and F. Wattimena and now abandoned; copending Ser. Nos. 173,325 and 173,326 filed Aug. 19, 1971, as continuations-in-part of said Ser. No. 812,920; Ser. No. 868,584 filed Oct. 22, 1969, by F. Wattimena and now abandoned; and Ser. No. 812,922 filed Apr. 2, 1969, by H. P. Wulff and F. Wattimena, now U.S. Pat. No. 3,634,464. The disclosures of said U.S. Pat. No. 3,634,464 and of said related applications Ser. Nos. 812,920, 812,923, 812,924 and 868,584 are incorporated herein by reference and copies of the specifications of said four applications have been placed in the file of the present application.

BACKGROUND OF THE INVENTION

1. Field of the Invention

This invention relates to improvements in metal oxide or hydroxide-siliceous solid materials and the use of these improved materials as catalysts for the epoxidation of olefins with organic hydroperoxides.

2. The Prior Art

In copending U.S. patent application Ser. Nos. 812,922 and 812,924, filed Apr. 2, 1969 and 173,325 and 173,326, filed Aug. 9, 1971 by H. P. Wulff and F. Wattimena, and now-abandoned application Ser. Nos. 812,920 and 812,923, filed Apr. 2, 1969 by Wulff and Wattimena and Ser. No. 868,584, filed Oct. 22, 1969 by Wattimena, it is shown that certain metal oxides and hydroxides, for example, the oxides and hydroxides of titanium, molybdenum, vanadium, zirconium and boron, when chemically combined with inorganic siliceous oxides, for example silica, are effective heterogeneous catalysts for the reaction of olefins with organic hydroperoxides to form olefin oxides. In such an olefin epoxidation reaction, an olefin is mixed with an organic hydroperoxide and passed over the metal oxide siliceous oxide catalyst. Ideally, the catalyst should cause the hydroperoxide to react exclusively with olefin to produce only olefin oxide. In other words, the catalysts should be 100% selective to the olefin epoxidation reaction. In fact, as with virtually all heterogeneously catalyzed reactions, only a substantial proportion, and not all of the hydroperoxide which reacts, reacts with olefin to form olefin epoxide in the presence of these known catalysts. The remainder of the reacting hydroperoxide forms less desirable by-products. Because of the well-known high reactivity of hydroperoxides and the general tendency of peroxides to decompose to non-desired products in the presence of a great number of catalyst materials, the search for ways to improve the selectivity of heterogeneous catalysts for epoxidation of olefins with organic hydroperoxides is especially important and also especially difficult.

STATEMENT OF THE INVENTION

It has now been found that epoxidation catalysts comprising an inorganic oxygen compound of silicon in chemical combination with certain metal oxides or hydroxides are improved and catalyze the epoxidation reaction of olefinically unsaturated hydrocarbons with organic hydroperoxides to give olefin oxides with improved efficiency when these catalysts are treated prior to use by contact with an organic silylating agent at elevated temperatures.

More especially, it has been found that processes for preparing olefin oxides by reacting olefins with organic hydroperoxides in the presence of metal oxide-siliceous solid heterogeneous catalysts at temperatures of from 25°C to 200°C are improved when the catalysts are contacted with an organic silylating agent at temperatures of up to about 450°C prior to use. In a particularly preferred embodiment of the invention, contacting metal oxide silica materials (such as titania-silica) with an organic silylating agent (such as an organic halosilane or an organic silazane) at temperatures of from 100°C to 450°C makes the resulting materials better, more efficient, and more selective catalysts for the epoxidation of olefins with organic hydroperoxides.

DETAILED DESCRIPTION OF THE INVENTION

The Catalysts Treated. The catalysts which are improved by silylation in accordance with the invention are olefin epoxidation catalysts consisting essentially of a solid inorganic oxygen compound of silicon in chemical combination with at least about 0.1% by weight of an oxide or hydroxide of titanium, molybdenum, vanadium, zirconium or boron. These metal oxide-hydroxide/siliceous oxide composites and methods for their preparation are described in the above listed U.S. applications Ser. Nos. 812,920, 812,922, 812,923, 812,924 and U.S. Pat. No. 3,634,464. The oxygen compound of silicon employed is a siliceous solid containing a major proportion of silica. In general, suitable inorganic siliceous solids are further characterized by having a relatively large surface area in relation to their mass. The term used herein and one normally used in the art to express the relationship of surface area to mass is "specific surface area". Numerically, specific surface area will be expressed as square meters per gram ($m^2/g$). Generally the inorganic siliceous solid has a specific surface area of at least 1 $m^2/g$ and preferably the average specific surface area is from 25 $m^2/g$ to 800 $m^2/g$.

One class of suitable inorganic siliceous solid is synthetic, porous silica consisting of particles of amorphous silica flocculated or linked together so that they form relatively dense, close-packed masses. Representatives of such materials are silica gel and precipitated silica. These silica products are porous, in that they have numerous pores, voids or interstices throughout their structures. The preparation and properties of such porous siliceous solids are described by R.G. Iler, "The Colloid Chemistry of Silica and Silicates", Cornell University Press, New York, 1955, Chap. VI and U.S. Pat. No. 2,657,149 of R. G. Iler, issued Oct. 27, 1953. A variety of silica gels are available commercially. Commercial silica gels consisting of at least 99% silica and having specific surface area of about 25 $m^2/g$ to about 800 $m^2/g$ and pore volume of about 0.3 to 1.3 ml/g are generally suitable.

Another class of suitable inorganic siliceous solids are synthetic silica powders consisting of particles of amorphous silica flocculated in open-packed, readily disintegrated, loosely-knit aggregates. Representatives of silica powders are fumed, pyrogenic silicas obtained by the combustion of hydrogen and oxygen with silicon tetrachloride or tetrafluoride. Fumed silicas are produced commercially and are sold by various companies such as by Cabot Corporation as "Cab-O-Sil" and by Degussa as "Aerosil". Fumed silicas suitably employed as catalyst generally consist of at least 99% silica and have surface area of about 50 $m^2/g$ to about 400 $m^2/g$ and particle size of about 0.007 micron to about 0.05 micron.

Other classes of inorganic siliceous solids are synthetic inorganic oxide materials containing a major portion of silica, known as refractory oxides, and naturally-occurring crystalline mineral silicates.

Synthetic amorphous inorganic siliceous solids are preferred over naturally-occurring crystalline mineral silicates as catalyst precursors. Particularly preferred synthetic inorganic siliceous solids are those consisting essentially of pure silica, e.g., at least 90% silica.

Chemically combined with the siliceous solid, in catalysts improved by the process of the invention, is a metal oxide or hyroxide. Suitable metal oxides or hydroxides include those of titanium, vanadium, boron, molybdenum and zirconium.

Generally, the catalysts contain from about 0.2 to 10% by weight (basis catalyst) of such metal oxides or hydroxides. Very suitable catalysts contain from 0.5 to 8% by weight of an oxide or hydroxide of titanium in chemical combination with silica.

A most preferred catalyst for treatment by this invention consists essentially of silica chemically combined with from 0.5 to 5% by weight of titanium oxide.

The oxide or hydroxide of titanium is preferably combined with the oxygen compound of silicon in a high positive oxidation state, e.g., tetravalent titanium. The proportion of the oxide or hyroxide of titanium combined in the catalyst composition can be varied, but generally the catalyst composition contains at least 0.1% by weight of the oxide or hyroxide of titanium with amounts from about 0.2% to about 50% by weight being preferred, although still larger (major) proportions of titanium oxide or hydroxide can be used.

The catalyst compositions which are to be treated suitably incorporate non-interfering and/or catalyst promoting substances, especially those which are chemically inert to the reactants and products. The catalysts may incorporate minor amounts of promoters, for example, the alkali metals or alkaline earth metals, as oxides or hyroxides. Alkali metal additions of from 0.01 to about 5% by weight (basis catalyst) are preferred as promoters.

An excellent catalyst for treating in accordance with this invention consists essentially of silica chemically combined with from 0.5 to 5% by weight of titanium oxide and from 0.01 to 5% by weight of calcium (as the oxide) as promoter.

The catalyst compositions are prepared by a variety of methods, including impregnation of a siliceous support with a suitable metal-containing solution followed by heating, cogelling the metal hydroxide and silica, and by calcining together a mixture of inorganic siliceous solid and metal oxides at elevated temperatures.

In still another technique, the catalyst composition is prepared by the surface reaction of silanol groups of an inorganic siliceous solid with a titanium salt by the procedure disclosed in U.S. Pat. No. 3,166,542 of Orzechowski and McKenzie, issued Jan. 19, 1965, U.S. Pat. No. 3,220,959 of Orzechowski, issued Nov. 30, 1965 or U.S. Pat. No. 3,274,120 of Aftandilian, issued Sept. 20, 1966. The catalyst composition is also suitably prepared by the reaction of hydroxyl groups of titanium dioxide containing such groups with a silicon tetrahalide using the same surface reaction procedure disclosed in the above patents. In yet another technique, a catalyst composition comprising a fumed, pyrogenic titania-silica is prepared by the combustion of hydrogen and oxygen with a mixture of silicon tetrahalide and titanium halide in accordance with conventional methods of preparing finely-divided fumed metal oxides and silica. Other techniques for incorporating an oxide or hydroxide of titanium on an inorganic siliceous-solid such as dry-mixing, co-precipitation, impregnation and ion-exchange are also suitably employed.

The catalyst composition is optionally, and preferably, subject to a pretreatment or activation prior to utilization in the process. The precise method of pretreatment will depend in part upon the form of chemical combination in which the components are provided, but in general the pretreatment comprises heating an initially prepared catalyst in an atmosphere of a non-reducing gas such as nitrogen, argon, carbon monoxide or oxygen-containing gas, e.g. air. One function served by this type of pretreatment operation is to convert the catalyst and catalyst promoter components into the form of hydroxides and oxides if these components are not initially provided in these forms. For example, initial catalyst components such as titanium chloride, tetrakismethylpropylaminotitanium and potassium chloride are converted to the corresponding oxide by heating in a non-reducing atmosphere. The pretreatment temperature is not critical and temperatures from about 350°C to about 800°C are satisfactory. Typical pretreatment times are from 1 to 18 hours. Subsequent to pretreatment, the titanium catalyst is employed in any convenient physical form, for example, as powder, flakes, spheres or pellets.

The catalyst composition may suitably incorporate non-interfering substances, especially those that are inert to the reactants and products. The method of catalyst preparation is not critical to the functioning or effectiveness of the present invention.

The Silylation Treatment. In accordance with the invention, metal oxide-siliceous-solid epoxidation catalysts as herein described are improved by treatment with an organic silylating agent at elevated temperatures. As is often the case in the field of heterogeneous catalysis, the exact catalytic mechanism for epoxidation with these catalysts and the exact reason for their improvement with silylation are not known with certainty. It is recognized, however, that the silylation treatment imparts a hydrophobic character to the metal oxide/-silica catalysts. Also, it is known that the silylation agent reacts with active hydrogens, i.e., Bronsted acid sites on the catalyst surface, replacing them with organo-silicon groups.

Suitable silylating agents include the organosilanes, organosilylamines, and organosilazanes. One generally preferred class of silylating agents are the tetrasubstituted silanes having from 1 to 3 hydrocarbyl substituents, such as, for example, chlorotrimethylsilane, dichlorodimethylsilane, chlorobromodimethylsilane, nitrotrimethylsilane, chlorotriethylsilane, iododimethylbutylsilane and chlorodimethylphenylsilane. Very suitable silylating agents of this class comprise the tetrasubstituted silanes wherein at least one substituent is halogen selected from fluorine, chlorine, bromine and iodine and at least one substituent is hydrocarbyl of from 1 to 4 carbon atoms, that is, organohalosilanes. Preferred organohalosilane silylating agents are the tetrasubstituted silanes having from 1 to 3 halo substituents selected from chlorine, bromine and iodine with the remainder of substituents being methyls. Particularly preferred organohalosilane silylating agents are dichlorodimethylsilane and chlorotrimethylsilane with chlorotrimethylsilane being most preferred.

Another generally preferred class of silylating agents are the organosilazanes, particularly the organodisilazanes. These materials are represented by formula (I)

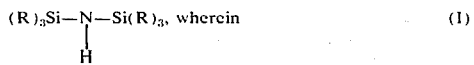

the six R's independently are organic groups or hydrogens. Preferably the organosilazanes contain R's which independently are hydrogens or alkyl groups of up to about 8 carbon atoms. Because of their method of production, these organosilazanes are symmetrical. Such silazanes include for example:

1,2-diethyldisilazane, 1,1,2,2-tetramethyldisilazane, 1,1,1,2,2,2-hexamethyldisilazane, 1,1,2,2-tetraethyldisilazane, and 1,2-diisopropyldisilazane. Of the organosilazanes, those in accord with formula I containing 4 or 6 lower alkyl groups, each of from 1 through 4 carbon atoms, and 0 or 2 hydrogens as their R groups are very preferred, with hexamethyldisilazane being the most preferred.

The two groups of preferred organic silylating agents each have advantages. The organohalosilane silylating agents are readily available and give excellent results under a variety of catalyst treatment conditions, although they pose a problem in that corrosive hydrogen halide is generated when they are used. The organosilazanes avoid the corrosion problem.

To effect the improving silylation, the metal oxide-silica chemical combination catalyst is contacted with a suitable silylating agent as herein defined, at elevated temperature. This may be accomplished in a variety of manners. For example, the catalyst particles may be mixed with a liquid silylating agent and then heated, or the catalyst particles may be heated and contacted with a stream of hot silylating agent vapor. The silylation may be carried out as a batch, semi-continuous or continuous process. Regardless of the method employed, best results are obtained with temperatures in the range of from about 100°C to about 450°C. With the organohalosilanes, temperatures of from about 300°C to about 425°C are preferred and temperatures of from about 375°C to about 410°C are most preferred as they tend to give the most selective catalyst products. With the organosilazanes, temperatures of from 100°C to 300°C are preferred and temperatures of from 150°C to 250°C are most preferred.

The length of time required for the silylating agent to react with the catalyst surface depends in part on the temperature and agent employed. Lower temperatures require longer reaction times. Generally, times of from 0.1 to 48 hours are suitable. With the organohalosilanes, times of from 1 to 48 hours are typical. With these agents, at a temperature of 325°C, for example, times of from about 10 to 48 hours are preferred. At a temperature of 450°C, 1 to 5 hours is preferred. With the organosilazanes 0.1 to 5 hours is preferred.

The amount of silylating agent employed can vary widely. Amounts of silylating agent of from 1% by weight (basis the entire catalyst composition) to about 75% by weight are suitable, with amounts of from 2 to 50% being preferred. The silylating agent can be applied to the catalyst either in one treatment or in a series of treatments. Generally a single treatment is preferred for reasons of operating economy.

It has been found that best results are often achieved by hydrating the metal/silica catalyst before silylation. Hydration is effected by contacting the catalyst prior to silylation with water and then heating it or by contacting the catalyst with steam at elevated temperatures, such as temperatures above 100°C, preferably in the range of 150°C to 450°C for from about ½ to about 6 hours. When employing organosilazanes as silylating agents, best results are achieved when hydration is effected by steaming at a temperature of 300-450°C for from about 1 to about 6 hours.

Epoxidation Catalysis. The solid silica/metal oxide catalysts when treated according to the invention are especially suitable for use as heterogeneous catalysts in liquid phase processes for epoxidation of olefinically unsaturated hydrocarbons by reaction with hydrocarbon hydroperoxides. Their use in such processes represents a major improvement therein, since markedly higher selectivities to olefin epoxide are achieved with treated catalysts than are possible with untreated catalysts at identical reaction conditions.

As olefinic reactant in this reaction may be employed any hydrocarbon having at least one aliphatic olefinically unsaturated carbon-carbon double bond, generally containing from 2 to 30 carbon atoms but preferably from 3 to 20 carbon atoms.

Preferred as olefinic reactant are the linear alpha alkenes of from 3 to 10 carbons such as propylene, butene-1, pentene-1, ocetene-1 and decene-1. Preferred hydrocarbon hydroperoxides are secondary and tertiary hydroperoxides of up to 15 carbon atoms, especially tertiary alkyl hydroperoxides such as tertiary butyl hydroperoxide; and aralkyl hydroperoxides wherein the hydroperoxy group is on a carbon atom attached directly to an aromatic ring, e.g., α-hydroperoxy-substituted aralkyl compounds such as α-methylbenzyl hydroperoxide and cumene hydroperoxide.

In such an epoxidation process it is suitable to employ a molar ratio of olefinic reactant to hydroperoxide of at least 1:1 with ratios of from 2:1 to 20:1 being preferred.

The epoxidation reaction is conducted in the liquid phase in solvents or diluents which are liquid at reaction temperature and pressure and are substantially inert to the reactants and the products produced therefrom. Very suitable as solvents are hydrocarbons such as the hydrocarbon corresponding to the organic hydroperoxide, or alternatively excess olefin. The reaction is conducted at moderate temperatures and pressures. Suitable reaction temperatures vary from about 0°C to about 200°C, but preferably from 25°C to 150°C. The reaction is conducted at or above atmospheric pressure. The precise pressure is not critical so long as the reaction mixture is maintained substantially as liquid phase. Typical pressures vary from about 1 atmosphere to about 100 atmospheres.

The olefin epoxide products are recovered from the resulting reaction product mixture by conventional means, e.g., fractional distillation, extraction, fractional crystallization and chromatographic techniques.

The olefin oxide products of the epoxidation are materials of established utility and many are chemicals of commerce. For example, illustrative olefin oxides which are readily prepared by the process of the invention such as propylene oxide, 1,2-epoxybutane, 1,2-epoxy-2-methyl-propane, 1,2-epoxydodecane and 1,2-epoxyhexadecane are formulated into useful polymers by polymerization or copolymerization as disclosed by U.S. Patents Nos. 2,815,343, 2,871,219 and 2,987,489.

The invention will be further described with reference to the following examples. There are for illustrative purposes only and are not to be construed as limitations on the invention.

EXAMPLE I

A. A 300 g sample of commercial silica gel having a surface area of 340 m$^2$/g and a pore volume of 1.15 cc/g (Davison, I.D. grade 59 silica) was contacted with a solution of 18 g of titanium tetachloride in 350 ml of methanol. The impregnated silica gel was dried at a temperature of 100°C and then calcined at a temperature of 800°C for 2 hours to produce a titania/silica product. 250 Grams of this calcined material was then rehydrated by contact with water for 10 hours to increase the number of silanol (—Si — O — H) groups on the catalyst surface. This catalyst was then contacted with 50 mls of chlorotrimethylsilane as vapor for 15 hours at 325°–350°C. The silyation was repeated twice. The catalyst preparation was repeated, without silylation. The resulting catalysts, (both silylated and unsilylated) were compared. Analysis showed that each contained 1.5% by weight titanium. The silylated catalyst was hydrophobic while the unsilylated catalyst was hydrophilic.

B. The silylated and unsilylated titania-silica products of part A were compartively tested as olefin epoxidation catalysts. In each test a 1 gram sample of catalyst was contacted with 17 g of octene-1 and 28.6 g of a 12% by weight solution of ethylbenzenehydroperoxide in ethylbenzene in a 100 ml glass reactor. The reaction temperature was 100°C and the reaction time was 1 hour. The results of these tests are given in Table I. The silylated catalyst gave markedly higher selectivity to the desired epoxide-forming reaction.

C. The epoxidation of propylene with ethylbenzene hydroperoxide was conducted in a 0.43 inch internal diameter 20 inch long fixed bed tubular reactor packed with 20 grams of the silylated titania-silica of Part A. A reaction mixture consisting of 6 moles of propylene per mole of ethylbenzene hydroperoxide in ethylbenzene was continuously fed to the reactor at a liquid hourly space velocity (LHSV) of 2 cc's per cc of catalyst per hour (hereinafter hr$^{-1}$). The reactor was maintained at the indicated temperature and a pressure of 450 psig. The reaction conditions and the analysis of the product mixture after the indicated cumulative operating time are provided in Table II. For purposes of comparison, the results of a similar test with an unsilylated 1.0% by weight titanium on silica catalyst additionally containing ½% by weight of calcium (prepared by the method of Example I) are provided in Table III.

TABLE I

| Catalyst | Hydroperoxide Conversion, % | Epoxide Selectivity, % |
|---|---|---|
| 1.5% Ti | 86.0 | 81.7 |
| Silylated 1.5% Ti | 85.6 | 94.7 |

TABLE II

Continuous Epoxidation with Silylated Catalyst

| Cumulative Hours | Temp., °C | Hydroperoxide Conversion, % | Propylene Oxide Selectivity, % |
|---|---|---|---|
| 83 | 80 | 97 | 92 |
| 271 | 85 | 97 | 95 |
| 478 | 88 | 96 | 92 |
| 623 | 93 | 97 | 91 |

TABLE III

Continuous Epoxidation with Unsilylated Catalyst

| Cumulative Hours | Temp., °C | Hydroperoxide Conversion, % | Propylene Oxide Selectivity, % |
|---|---|---|---|
| 170 | 90 | 96.2 | 89.2 |
| 215 | 90 | 94.9 | 91.6 |
| 400 | 97 | 97 | 88 |
| 500 | 103 | 98 | 87 |
| 563 | 110 | 99.6 | 86.2 |

EXAMPLE II

A. Two silylated titania-silica catalysts were prepared. First, two 350 gram batches of calcined, unsilylated, 1.5% by weight titanium catalyst were prepared as described in part A of Example I. Then, these materials were each rehydrated with water and contacted with 50 grams of chlorotrimethylsilane for 15 hours. The first catalsyt (A) was silylated once at a temperature of 355°–375°C while the second catalyst (B) was silylated once at a temperature of 365°–390°C.

B. The silylated catalysts of part A were repeatedly tested as olefin epoxidation catalysts by the batch test described in part B of Example I, octene-1 being epoxidized with ethylbenzenehydroperoxide. The results of these tests are given in Table IV.

C. Catalysts A and B were evaluated in the continuous propylene epoxidation reactor of Example I, Part C with the conditions and feeds of that Example. After 500 hours of operation, at 95°C both catalysts A and B exhibited 95°–96% propylene oxide selectivity at 95°–96% hydroperoxide conversion.

TABLE IV

| Catalyst | Hydroperoxide Conversion, % | Epoxide Selectivity, % |
|---|---|---|
| A (silylated at 355–375°C) | 95–96 | 91–92 |
| B (silylated at 365–390°C) | 97–98 | 93–94 |
| Unsilylated* | 94–96 | 79–81 |

*Prepared by the method of Example I, but with forced gas flow during calcination.

EXAMPLE III

A. A 40 g sample of commercial silica gel having a surface area of 340 m$^2$/g and a pore volume of 1.15 cc/g (Davidson grade 59 silica) was contacted with a solution of 1.6 g of titanium tetrachloride in 50 ml of water containing 5 grams of oxalic acid. The impregnated silica gel was dried at a temperature of 100°C and then calcined at a temperature of 800°C for 2 hours to produce a titania/silica product.

A 35 gram sample of this catalyst was then contacted with 20 mls of chlorotrimethyl silane as vapor for 15 hours at 325°–350°C. This silylation was repeated twice. The resulting catalysts (both silylated and unsilylated) were compared. Analysis showed that each contained 1.0% by weight titanium. The silylated catalyst was hydrophobic, while the unsilylated catalyst was hydrophilic.

B. The epoxidation of propylene with ethylbenzenehydroperoxide was conducted in an 0.43 inch internal diameter 20 inches long fixed bed tubular reactor packed with 20 grams of the silylated silica-titania catalyst of part A. This experiment was repeated with the catalyst of part A, unsilylated. A reaction mixture consisting of 6 moles of propylene per mole of ethylbenzene hydroperoxide in ethylbenzene was continuously fed to the reactor, maintained at the indicated temperature and a pressure of 450 psig, at a rate giving a residence time of 24 minutes. The reaction conditions and analysis of the product mixture after the indicated reaction time are provided in Table V.

TABLE V

| Cumulative Hours | Temp., °C | Silylated Catalyst Hydroperoxide Conversion, % | Propylene Oxide Selectivity, % |
|---|---|---|---|
| 500 | 90 | 95–97 | 89–93 |
| | | Unsilylated Catalyst | |
| 250 | 90 | 95–96 | 85–87 |

C. The silylated titania-silica product of part A was tested as octene-1 epoxidation catalyst. In this test a 1 gram sample of catalyst was contacted with 36.5 g of octene-1 and 4.5 g of 98% tertiary-butylhydroperoxide in a 100 ml glass reactor. The reaction temperature was 101°–103°C. After 1 hour, 73% of the hydroperoxide was converted (with 99% selectivity to octene oxide) and after 3 hours 90% was converted (also with 99% selectivity).

EXAMPLE IV

A. A 300 gram batch of calcined, unsilylated, 1.5% by weight titanium catalyst was prepared as described in part A of Example I. A 250 gram sample of this catalyst was then contacted with 50 mls of dichlorodimethylsilane as vapor for 10 hours at 350°C.

B. The silylated and unsilylated products of part A were comparatively tested as olefin epoxidation catalyst. In each test a 1 gram sample of catalyst was contacted with 17 g of octene-1 and 28.6 g of a 12% by weight solution of ethylbenzene hydroperoxide in ethylbenzene in a 100 ml glass reactor. The reaction temperature was 100°C and the reaction time was 1 hour. The results of these tests are given in Table VI.

TABLE VI

| Catalyst | Hydroperoxide Conversion, % | Epoxide Selectivity, % |
|---|---|---|
| Unsilylated 1.5% wt Titanium | 95 | 79 |
| Silylated with $(CH_3)_2SiCl_2$ | 87 | 89 |
| Silylated with $(CH_3)_3SiCl$ | 95 | 91 |

EXAMPLE V

A calcined, unsilylated catalyst containing 1% by weight titanium and additionally ½% by weight of calcium was prepared as described in part A of Example I.

A portion of this catalyst was then silylated at 360°–390°C with trimethylchlorosilane.

Samples of both the silylated and unsilylated catalysts were tested by the batch epoxidation of Example I, Part B. The silylated material gave 91% selectivity to propylene oxide at 78% conversion while the untreated material gave 86% selectivity at 83% conversion.

EXAMPLE VI

A 1.5% by weight titanium-on-silica catalyst was prepared by treating an acidic silica hydrogel with a titanium salt solution, adding base to the mixture, drying and then calcining.

A sample of this catalyst was then treated with trimethylchlorosilane in benzene at 60°–70°C for 2 hours and dried at 150°C for 2 hours.

A single sample of silylated material was then repeatedly used as a catalyst for the batch epoxidation of octene-1 with ethylbenzene hydroperoxide using the apparatus, feeds and conditions of Example I, part B. The results of the repeated 1 hour tests are given in Table VII.

TABLE VII

| Cumulative Number of Times Catalyst Used | Hydroperoxide Conversion, % | Epoxide Selectivity, % |
|---|---|---|
| 1 | 95 | 85 |
| 2 | 91 | 91 |
| 3 | 86 | 94 |
| 4 | 81 | 94 |
| 5 | 73 | 94 |
| 6 | 64 | 97 |
| 11 | 53 | 99 |

EXAMPLE VII

A. A 1480 gram batch of the commercial silica gel (Davison I.D. grade silica 14-30 mesh) was contacted with a solution of 130 grams of tetraisopropyltitanate and 97 grams of acetylacetone in 1.25 liters of isopropyl alcohol. The impregnated silica gel was charged to an electrically heated calcination tube and dried to a bed temperature of 500°C under a nitrogen blanket. Air was then admitted and the temperature was raised to 800°C and there held for 4 hours to burn off residual carbon and thoroughly chemically combine the silica and titania. 1183 Grams of this material was then rehydrated by contact with steam at 400°C for 3 hours. This rehydrated material was cooled to 200°C then contacted with hexamethyldisilazane vapor at 200°C for 1 hour to give a silylated catalyst in accord with this invention. 75 Grams of hexamethyldisilazane were taken up by the catalyst.

B. The catalyst of part A, with and without silylation was tested as a catalyst for the epoxidation of olefins with hydroperoxide using the apparatus, feedstocks and general procedures of Example I part B. The results of these tests are given in Table VIII.

TABLE VIII

| Catalyst | Hydroperoxide Conversion, % | Epoxide Selectivity, % |
|---|---|---|
| Unsilylated | 95 | 72 |

TABLE VIII-continued

| Catalyst | Hydroperoxide Conversion, % | Epoxide Selectivity, % |
|---|---|---|
| Silylated | 95 | 93. |

I claim as my invention:

1. A process for the epoxidation of an olefinically unsaturated compound which comprises reacting the olefinically unsaturated compound in the liquid phase with an organic hydroperoxide at a temperature of from about 25°C to about 200°C in the presence of a catalyst prepared by reacting an olefin epoxidation catalyst comprising an inorganic siliceous solid in chemical combination with an oxide or hydroxide of titanium with an organic silylating agent at an elevated silylation temperature in the range from about 100° to about 450°C for from about 0.1 to 48 hours.

2. A process for the epoxidation of an olefinically unsaturated compound which comprises reacting the olefinically unsaturated compound in the liquid phase with an organic hydroperoxide at a temperature of from about 25°C to about 200°C in the presence of a catalyst prepared by reacting an olefin epoxidation catalyst comprising an inorganic siliceous solid in chemical combination with an oxide or hydroxide of titanium for a time period of from 0.1 to 48 hours, at a temperature from about 100°C to about 450°C, with an organic silylating agent selected from the group consisting of (a) trihalomonohydrocarbylsilanes, dihalo-dihydrocarbylsilanes and mono-halotrihydrocarbylsilanes wherein the halo substituents are selected from the group consisting of chloro, bromo, and iodo, and (b) organodisilazanes having the structural formula

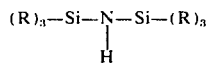

wherein 4 or 6 of the R's independently are lower alkyls of from 1 through 4 carbon atoms and the other R's independently are hydrogens.

3. The process of claim 2 wherein the olefinically unsaturated compound is an alkene of from 3 to 20 carbon atoms and the organic hydroperoxide is selected from the group consisting of tertiary alkyl hydroperoxides and aralkyl hydroperoxides.

4. The process of claim 3 wherein the alkene is a linear alkene of from 3 to 10 carbon atoms, the hydrocarbyl substituents in the halosilanes each have from one to four carbon atoms and all the R's in said organodisilazanes are lower alkyl groups of one to four carbon atoms.

5. The process of claim 4 wherein the alkene is propylene.

6. The process of claim 2 wherein the silylating agent is chosen from the group consisting of trihalomonohydrocarbylsilane, dihalodihydrocarbylsilane, and monohalotrihydrocarbylsilane; the halo substituents are selected from the group consisting of chloro, bromo and iodo; the hydrocarbyl substituents each have from 1 to 4 carbon atoms; the silylation reaction time is from about 1 to 48 hours; and the silylation reaction temperature is from about 300°C to 450°C.

7. The process of claim 6 wherein the organic silylating agent is chlorotrimethylsilane.

8. The process of claim 6 wherein said unsaturated compound is propylene.

9. The process of claim 2 wherein the silylating agent is an organodisilazane

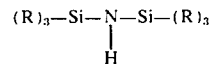

and the silylation reaction time is from 0.1 to 5 hours.

10. The process of claim 9 wherein every R is methyl.

11. The process of clam 9 wherein said unsaturated compound is propylene.

12. The process for the epoxidation of a linear alpha alkene of from 3–20 carbon atoms which comprises reacting the linear alpha alkene with an organic hydroperoxide in the presence of a catalyst prepared by reacting an olefin epoxidation catalyst comprising an inorganic siliceous solid containing a major portion of silica in chemical combination with from 0.2 to 10% by weight of total catalyst of titanium oxide or hydroxide for from 0.1 to 48 hours at a temperature of from 100°C to about 450°C with an organic silylating agent selected from the group consisting of (a) trihalomonohydrocarbylsilanes, dihalo-dihydrocarbylsilanes and monohalotrihydrocarbylsilanes wherein the halo substituents are selected from the group consisting of chloro, bromo, and iodo and the hydrocarbyl substituents each have from 1 to 4 carbon atoms and (b) organodisilazanes having the structural formula

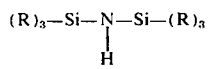

wherein 4 or 6 of the R's independently are lower alkyls of from 1 through 4 carbon atoms and the other R's independently are hydrogens.

13. The process of claim 12 wherein said alkene is propylene and said silylating agent is chlorotrimethylsilane.

14. The process of claim 12 wherein said alkene is propylene and said silylating agent is an organodisilazane of the formula

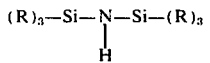

wherein R is alkyl of 1 to 4 carbon atoms.

15. The process of claim 14 wherein every R is methyl.

16. A process for the epoxidation of an olefinically unsaturated compound which comprises reacting the olefinically unsaturated compound in the liquid phase with an organic hydroperoxide at a temperature of from about 25°C to about 200°C in the presence of a catalyst prepared by reacting an olefin epoxidation catalyst comprising an inorganic siliceous solid in chemical combination with an oxide or hydroxide of titanium for a time period of from 0.1 to 48 hours, at a temperature from about 100°C to about 450°C, with an organic silylating agent selected from the group consisting of (a) tetrasubstituted silanes having from 1 to 3 hydrocarbyl substituents wherein the halo substituents are selected from the group consisting of chloro, bromo, and iodo and (b) organodisilazanes having the structural formula

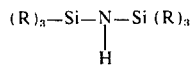

wherein the 6 R's independently are lower alkyls of from 1 through 8 carbon atoms or hydrogens.

17. The process for the epoxidation of propylene which comprises reacting propylene with ethylbenzene hydroperoxide, cumene hydroperoxide or tertiary butyl hydroperoxide at a temperature of from about 25°C to about 200°C in the presence of a catalyst prepared by reacting an olefin epoxidation catalyst comprising an inorganic siliceous solid containing at least 99% silica in chemical combination with from 0.2 to 10% by weight of total catalyst of titanium oxide or hydroxide for a time period of from 1 to 48 hours at a temperature of from about 300°C to about 425°C with chlorotrimethylsilane as silylating agent.

18. The process for the epoxidation of propylene which comprises reacting propylene with ethylbenzene hydroperoxide, cumene hydroperoxide or tertiary butyl hydroperoxide at a temperature of from about 25°C to about 200°C in the presence of a catalyst prepared by reacting an olefin epoxidation catalyst comprising an inorganic siliceous solid containing at least 99% silica in chemical combination with from 0.2 to 10% by weight of total catalyst of titanium oxide or hydroxide for a time period of from about 0.1 to 5 hours at a temperature of from about 150°C to 300°C with hexamethyldisilazane as silylating agent.

* * * * *